3,384,993
ARTICLE FOR AGRICULTURAL USE
Charles V. Kane, Highland Park, Ill., assignor to The Delta Company, a firm consisting of Julius Abler, Elizabeth E. Abler, Birdie C. Engelman, Julius Abler, and Elizabeth Abler, trustees, Wheeling, Ill.
Filed Sept. 8, 1965, Ser. No. 485,797
3 Claims. (Cl. 47—58)

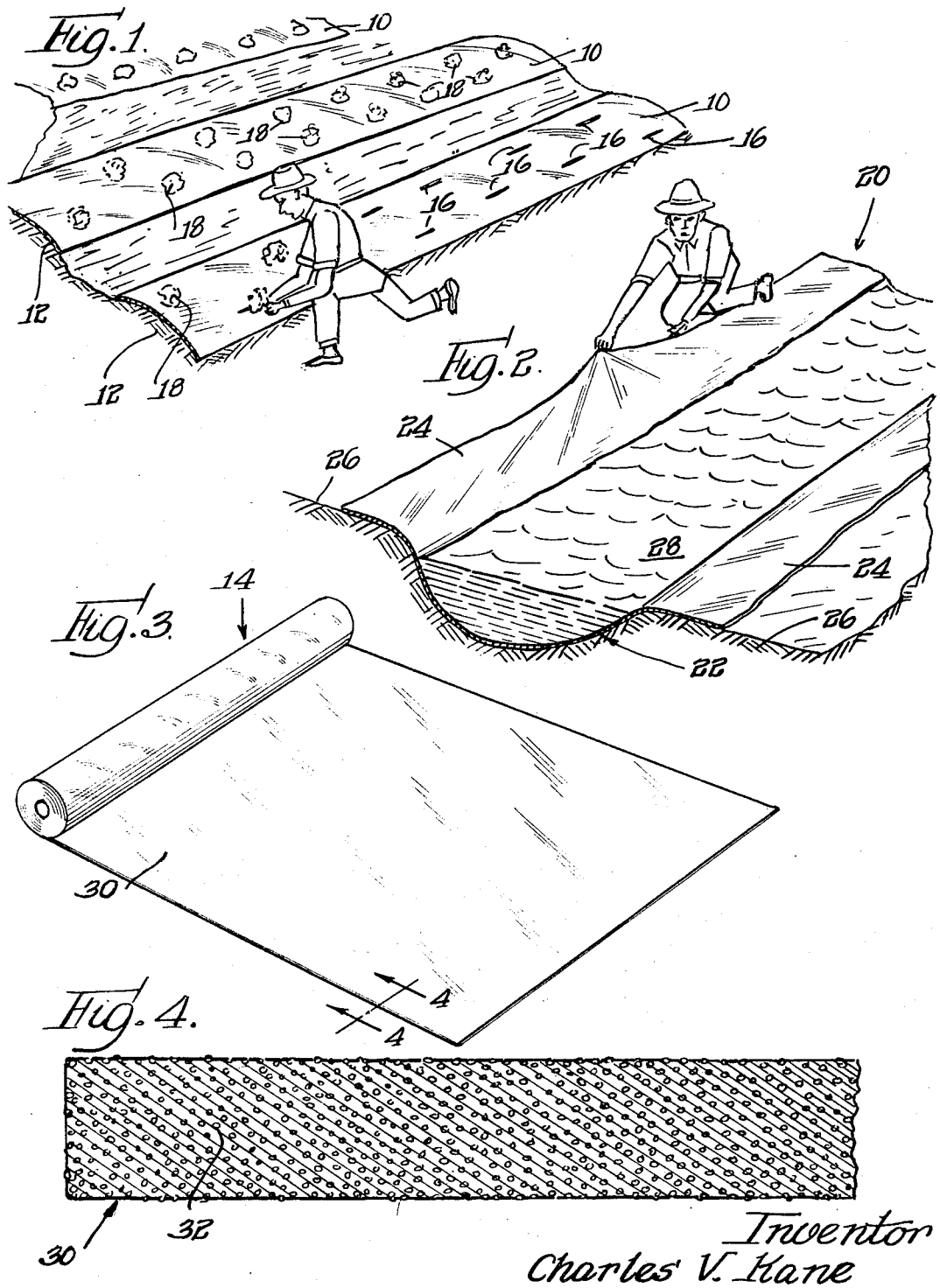

This invention relates to an article in the form of a sheet or film of plastic and the use thereof in the agriculture or plant cultivation field.

One of the important uses of the article of the present invention is that of a mulching agent. When used for this purpose, the article serves effectively to establish conditions in and about cultivated soil which materially favor seed germination and plant growth. More specifically, the article of this invention, throughout the growing season, not only serves as an excellent source of plant nutrient material but also acts both to retard evaporation of soil moisture and to increase soil temperature to promote seed germination. In addition, the article of this invention, as a mulching agent, functions to curtail weed growth and to reduce the incidence of damage to seeds and seedlings by biological agents. With the passage of time, the article disintegrates and may be mixed into the soil to make it an integral part thereof thereby eliminating any need for removing the article from the soil prior to normal pre-sowing soil cultivation operations.

Apart from its use as a mulching agent, the article of the present invention also can be used as a liner for irrigation canals, ditches, and the like. When used for this purpose, the article acts to prevent loss of water due to ground seepage while at the same time releasing plant nutrient materials to the water for conveyance to plant life in the irrigated field.

The article of this invention, whether used as a mulching agent, or a covering or lining material, is extremely easy to handle and can be quickly applied with minimal personnel. Its initial cost is nominal and, once applied, it requires little or no maintenance.

The objectives of the present invention are attained with a plastic material, in flexible sheet or film form, having incorporated therein at least one water-soluble, normally solid plant nutrient substance. In accordance with the practice of this invention, the plant nutrient substance is admixed with the plastic material prior to forming the material into a sheet or film thereby to render the nutrient substance an intimate and integral part of the sheet or film. Conventional extrusion equipment, for instance, can be used in forming the sheets or films of this invention. The finished article advantageously is rolled into a roll to facilitate packaging and handling. The rolls can be made into any convenient width and the length of sheet or film comprising the roll may be varied as desired.

The plastic material utilized in forming the unique article of the present invention can be selected from a wide group. Among the materials that can be used are polyethylene, polypropylene, cellulose acetate, cellulose acetate butyrate, polyvinyl chloride acetate, styrene acrylonitrile, and the like. Especially satisfactory results are attained with a polymeric plastic material sold under the trademark "Surlyn A" (E. I. du Pont de Nemours & Co.). This material is an ionomer and has as its major constituent ethylene. The ionomer and its preparation is the subject matter of Belgian Patent No. 621,846 which issued on Mar. 28, 1963. U.S. Patent No. 3,264,272, dated Aug. 2, 1966, also is directed to the ionomer and its preparation. The product is available commercially in small, free-flowing pellet form and conveniently can be admixed, prior to extrusion into a sheet or film, with plant nutrient substances having utility in the present invention.

The plant nutrient substances also can be selected from a wide group. As indicated, the nutrients should be normally solid and water-soluble. Typical examples of nutrients that can be used are ammonium nitrate, ammonium sulfate, ammonium phosphate, potassium chloride, potassium nitrate, potassium sulfate, and urea. Mixtures of two or more such nutrients can, of course, be employed in forming the article of this invention.

The particle size of plant nutrient substance should be sufficiently small to enable the admixture of the nutrient and the plastic material to be formed into an integrated flexible sheet or film which is capable of being rolled into a roll and of later being applied at a desired site without tearing or cracking. This objective can be attained in accordance with the practice of this invention with plant nutrient particle sizes ranging from 1 to 2 microns to a mesh size of from about 100, usually about 300 to 400, or smaller. Conventional equipment such as a hammer mill or ball mill can be employed, if necessary, to provide particles of suitable size.

The concentration of plant nutrient comprising the article is variable. Generally speaking, the nutrient will constitute from about 10% to 50%, especially desirably from about 20% to 40%, by weight, of the article.

Various agents, including extenders, plasticizers, fillers, pigments, and the like, may be added to the plastic material-plant nutrient substance mixture to modify and/or improve the qualities of the article of this invention. Thus, by way of specific illustration, in utilizing the aforedescribed "Surlyn A" as the plastic material, the addition of a minor proportion, of the order of about 1% to about 3%, by weight, of carbon black to the mixture prior to extrusion provides an article having enhanced strength characteristics.

The thickness of the sheets or films formed in accordance with the practice of this invention also is variable, but, generally speaking, will range from about 0.1 mil to about 2 mils, with a thickness in the range of from about 0.5 to about 1 mil being especially preferred.

The following is a specific illustrative example of the manner of carrying out the present invention:

A mixture comprising two parts by weight of "Surlyn A" pellets and one part by weight of ammonium nitrate having an average particle size of approximately 300 mesh is prepared and transferred to a blending kettle. The mixture is heated to 450° F. and stirred for 30 minutes. The heated mixture is introduced into an extrusion hopper and passed through an extrusion die to form it into a flat film. The film has a thickness of approximately 0.5 mil and is translucent. It is wound upon itself in roll form.

Referring, now, to the drawing which illustrates an embodiment of the article of the present invention and its use:

FIG. 1 is a view in perspective of said embodiment showing its use as a mulching material;

FIG. 2 is a view in perspective of said embodiment showing its use as a lining material for an irrigation ditch;

FIG. 3 is a view in perspectve of said embodiment in roll form; and

FIG. 4 is an enlarged fragmentary sectional view taken substantially along line 4—4 of FIG. 3.

In FIG. 1, the article of this invention, in the form of films or sheets 10, is shown in position on rows 12 of seeded soil. The sheets 10 can be applied manually, or mechanically, by simply anchoring one end thereof at the head of a row and then unrolling it from a roll 14 such as is illustrated in FIG. 3. The sheets 10 may be applied on the top soil either before the seed is sown or after. If applied before sowing, the sheets simply are slit, as indicated generally at 16, and the seed thereafter is embedded in the soil. The young plants 18 will eventually work their way through the slits. In the case where the sheets are applied after sowing to promote germination, for example, the sheets are later slit and the young plants are allowed to emerge therethrough. In either case, the growing plants tend to keep the sheets in place throughout the growing season. During this time water, in the form of soil moisture and rainfall, coming into contact with the sheets, dissolves and leaches out the plant nutrients in the sheets. The nutrients enter the soil with the water where they are utilized by the growing plants. The protective covering provided by the sheets serves also to effectively prevent evaporation of soil moisture and substantially eliminates the need for weeding during the growing season. The unusual growth promoting attributes of the sheets so materially accelerates maturation of plants such as vegetables that the growing season can be extended to enable more than one crop to be obtained during a normal season. After the crop has been harvested, the sheets simply can be ground into the soil where, after a time, they will disintegrate and become indistinguishable from the soil. Thus, none of the plant nutrient substance in the sheet is lost.

In FIG. 2, the article of this invention, in the form of a sheet 20, is shown being positioned in an irrigation ditch 22 to prevent loss of water due to ground seepage. The sheet 20 simply is draped across the ditch and held in position by anchoring its edges 24—24 in the soil 26 along the sides of the ditch. Water 28 coming into contact with the sheet 20 as it traverses the ditch 22 dissolves and leaches out a portion of the plant nutrient substance, or substances, in the sheet. The nutrient-enriched water thus acts as an effective vehicle for fertilizing plant life nourished by the water. While the useful life of the sheet 20 will vary in accordance with conditions of use, generally speaking, a sheet life of the order of 3 to 6 months, usually 4 to 5 months, can be expected.

The form in which the article of the present invention most advantageously is handled and applied is shown in FIG. 3. The roll 14 may be made of any convenient width and the length of the sheet 30 (or sheets) comprising the roll likewise is variable. Thus, when the article is used as a mulching material, the roll 14 will be of a width corresponding substantially to that of the soil rows on which it is to be applied. When the article is to be used as a liner for an irrigation ditch, on the other hand, the width of the roll 14 should be such as to allow an appreciable overlay at the edges of the ditch to enable the sheet 30 to be anchored securely in position.

FIG. 4 is a greatly enlarged representation of a portion of the sheet 30. The random and wide distribution of the plant nutrient substance 32 is indicated. The distribution is such that portions of the nutrient substance 32 are contacted by soil moisture or water continuously during the life of the sheet. This has the effect of preventing too rapid leaching of the substance 32 from the sheet and tends to provide a long-lasting source of plant nutrient substance throughout the growing season.

The foregoing detailed description has been given for purposes of explanation only and no unnecessary limitation should be understood therefrom, it being understood that various changes may be made in the manner of carrying out the invention, all within the spirit of the guiding principles and teachings provided herein.

What is claimed is:

1. A method of substantially preventing ground seepage in an irrigation ditch, or the like, while enriching the water passing through same with a plant nutrient substance, comprising providing a flexible, substantially water impermeable sheet of a plastic material, said sheet incorporating a plant nutrient substance in a form to enable it to be released from said sheet by water in contact with the sheet, lining the ditch, or the like, with said sheet and securing the edges of the sheet to prevent any substantial movement of the sheet, passing water through the thus lined ditch, or the like, whereby a portion of the plant nutrient substance of the sheet will be dissolved and carried by the water to plant life to be nourished thereby, said sheet substantially preventing loss of water due to ground seepage as the water traverses the lined ditch, or the like.

2. A method as claimed in claim 1 wherein the sheet contains from 1 to 3%, by weight, of carbon black to enhance the strength characteristics thereof.

3. A method as claimed in claim 1 wherein the plant nutrient substance comprises from about 10% to 50%, by weight, of the sheet.

References Cited

UNITED STATES PATENTS

| | | | |
|---|---|---|---|
| 1,870,110 | 8/1932 | Hall | 47—9 |
| 2,648,165 | 8/1953 | Nestor | 47—56 |
| 3,043,709 | 7/1962 | Amborski | 117—7 |
| 3,205,619 | 9/1965 | Henry | 47—9 |
| 3,274,731 | 9/1966 | Vigneault et al. | 47—9 |

ROBERT E. BAGWILL, *Primary Examiner.*